United States Patent
Adkins (10) Patent No.: US 8,074,609 B2
(45) Date of Patent: Dec. 13, 2011

(54) RAWHIDE EDIBLE CHEW WITH PIZZLE INNER MEMBER AND METHOD FOR MAKING THE SAME

(75) Inventor: Grant Adkins, Thousand Oaks, CA (US)

(73) Assignee: JAKKS Pacific, Inc., Malibu, CA (US)

( * ) Notice: Subject to any disclaimer, the term of this patent is extended or adjusted under 35 U.S.C. 154(b) by 0 days.

(21) Appl. No.: 12/661,850

(22) Filed: Mar. 25, 2010

(65) Prior Publication Data

US 2011/0232582 A1 Sep. 29, 2011

(51) Int. Cl.
*A01K 29/00* (2006.01)

(52) U.S. Cl. .................. 119/710; 119/707; 119/709

(58) Field of Classification Search .......... 119/702, 119/707, 708, 709, 710, 711; *A01K 15/02*
See application file for complete search history.

(56) References Cited

U.S. PATENT DOCUMENTS

| | | | |
|---|---|---|---|
| 5,673,653 A * | 10/1997 | Sherrill ............ | 119/709 |
| 5,813,366 A | 9/1998 | Mauldin, Jr. | |
| 5,832,877 A | 11/1998 | Markham | |
| 5,897,893 A | 4/1999 | Mohilef | |
| 5,947,061 A | 9/1999 | Markham et al. | |
| 5,965,182 A | 10/1999 | Lindren | |
| 6,129,053 A | 10/2000 | Markham et al. | |
| 6,178,922 B1 | 1/2001 | Denesuk et al. | |
| 6,223,693 B1 | 5/2001 | Erlberg et al. | |
| 6,238,715 B1 | 5/2001 | Baikie | |
| 6,277,420 B1 | 8/2001 | Andersen et al. | |
| 6,584,938 B2 | 7/2003 | Sherrill et al. | |
| 6,799,536 B1 | 10/2004 | Jia et al. | |
| 6,840,196 B2 | 1/2005 | Kirch | |
| 6,886,496 B1 | 5/2005 | Brown | |
| 6,895,900 B2 | 5/2005 | Hingst | |
| 6,935,275 B2 | 8/2005 | Jia et al. | |
| 7,025,020 B2 | 4/2006 | Brown | |
| 7,082,894 B2 | 8/2006 | Sherrill et al. | |
| 7,107,938 B2 | 9/2006 | Brown | |
| 7,147,888 B2 | 12/2006 | Brown et al. | |
| 7,194,981 B2 | 3/2007 | Kirch et al. | |
| 2002/0073927 A1 * | 6/2002 | Chamberlain ............ | 119/72 |
| 2002/0185084 A1 | 12/2002 | Sherrill et al. | |
| 2002/0185085 A1 | 12/2002 | Sherrill et al. | |
| 2003/0106500 A1 | 6/2003 | Kirch | |
| 2003/0215547 A1 | 11/2003 | Leyh, Jr. | |
| 2004/0025803 A1 | 2/2004 | Sherrill et al. | |
| 2004/0035371 A1 | 2/2004 | Tsengas | |
| 2004/0126462 A1 * | 7/2004 | Tepper et al. ............ | 426/89 |
| 2004/0144331 A1 | 7/2004 | Brown | |
| 2005/0003050 A1 | 1/2005 | Agnew | |
| 2005/0039697 A1 | 2/2005 | Hingst | |
| 2005/0100641 A1 | 5/2005 | Lin | |
| 2005/0145193 A1 * | 7/2005 | Kirch ............ | 119/710 |
| 2005/0147719 A1 * | 7/2005 | Hill et al. ............ | 426/132 |
| 2005/0217603 A1 * | 10/2005 | Hingst ............ | 119/710 |

(Continued)

*Primary Examiner* — David Parsley
*Assistant Examiner* — Thien Thanh Pham
(74) *Attorney, Agent, or Firm* — Tope-McKay & Associates (57) ABSTRACT

A rawhide chew with a pizzle inner member is described. The rawhide chew includes a rawhide outer layer formed of a rawhide sheet. The rawhide outer layer comprises a hole cut therethrough to form a cut-out window. Pizzle positioned within the rawhide outer layer such that the pizzle is externally viewable through the cut-out window. Further, the pizzle is rolled within the rawhide outer layer such that no edges of the pizzle protrude through the cut-out window.

2 Claims, 8 Drawing Sheets

U.S. PATENT DOCUMENTS

| | | |
|---|---|---|
| 2005/0217604 A1 | 10/2005 | Brown |
| 2005/0233038 A1 | 10/2005 | Weinberg |
| 2005/0244554 A1 | 11/2005 | Weinberg |
| 2005/0271775 A1 | 12/2005 | Kirch et al. |
| 2006/0107906 A1* | 5/2006 | Weinberg ................ 119/710 |
| 2006/0196444 A1 | 9/2006 | Radcliffe et al. |
| 2006/0243219 A1* | 11/2006 | Brown .................... 119/710 |
| 2007/0028852 A1* | 2/2007 | Ciciora .................... 119/709 |
| 2007/0098840 A1 | 5/2007 | Axelrod |
| 2007/0098841 A1 | 5/2007 | Keehn et al. |
| 2007/0113796 A1 | 5/2007 | Schildgen et al. |
| 2007/0116798 A1 | 5/2007 | Brown et al. |
| 2007/0193531 A1* | 8/2007 | Anderson et al. ............ 119/709 |
| 2007/0264415 A1 | 11/2007 | Axelrod et al. |
| 2007/0289552 A1* | 12/2007 | Axelrod et al. .............. 119/710 |
| 2008/0118606 A1 | 5/2008 | Stern |
| 2008/0141948 A1 | 6/2008 | Renforth et al. |
| 2008/0145485 A1 | 6/2008 | Tepper et al. |
| 2008/0314331 A1 | 12/2008 | DeGhionno |
| 2008/0314332 A1* | 12/2008 | Jacobs ..................... 119/709 |
| 2009/0004338 A1* | 1/2009 | Anderson et al. ............. 426/92 |

* cited by examiner

RAWHIDE EDIBLE CHEW WITH PIZZLE INNER MEMBER AND METHOD FOR MAKING THE SAME

BACKGROUND OF THE INVENTION (1) Field of Invention

The present invention relates to an edible chew for domestic carnivorous animals and, more specifically, to an edible rawhide chew with a pizzle inner member.

(2) Description of Related Art

Chews have long been known in the art as a means for encouraging and satiating the chewing instinct of domestic carnivorous animals. By way of example, a rawhide chews are commonly provided to dogs to allow them to satiate their inherent need to chew.

As a "chew," it is desirable that the chew be capable of enduring the rigorous chewing activity of a dog, etc., for a protracted period of time. To accommodate the desire for longevity and durability, chews are often designed of synthetic materials or rawhide.

Synthetic materials, such as rubber, etc., provide a suitable chewing sensation and are generally durable. However, due to the chemicals required to create such chews, they can be harmful to a dog if consumes them and are not considered edible because they can not be digested.

Alternatively, rawhide, which is a component typically formed from the hide of an animal, provides both a natural and durable substance. Rawhide is commonly given to a dog as a chew because of its ability to withstand the treatment provided by the dog. More specifically, rawhide is a relatively tough and sheet-like component that can be knotted into a variety of forms that are desirable to dogs. A problem with rawhide is that it is relatively tasteless. Thus, rawhide-only chews can become boring to a dog over time which causes the dog to lose interest in such chews.

To maintain a dog's interest in a rawhide chew, some have attempted to combine the rawhide chew with a chew treat, such as jerky. For example, U.S. Pat. No. 5,673,653, issued to Sherrill (the '653 patent), is a rawhide chew with jerky wrapped within and extending from the chew. According to '653 patent, the jerky is an appetizing treat for a dog that entices the dog to chew the chew. Admittedly, dogs are extremely attracted to jerky. While the extension of the jerky may entice a dog to grasp the jerky and continue chewing on the chew, the use of jerky has a drawback in that once the jerky is gone, the dog begins to lose interest in the remaining rawhide. In practice, dogs often chew upon the jerky and rawhide until only the rawhide remains. At that point, a dog often abandons the remaining rawhide. Thus, a dog's interest in the chew is present due to the taste and smell of the jerky and not the mastication qualities of the chew.

Thus, a continuing need exists for a chew that maintains a dog's interest due to mastication qualities of the chew itself.

SUMMARY OF INVENTION

While considering the failure of others to make use of all of the above factors/ingredients/steps/components in this technology space, the inventor unexpectedly realized that a rawhide chew with pizzle therein would withstand rigorous chewing while motivating a dog to continue chewing due to the varying chewing consistencies (mastication qualities) between rawhide and pizzle. When a dog starts to chew on a dried pizzle the pizzle becomes very chewy from the dog's saliva, creating a unique and interesting texture for the dog while he is chewing.

The rawhide chew includes a rawhide outer layer formed of a rawhide sheet. The rawhide outer layer comprises a hole cut therethrough to form a cut-out window. Pizzle positioned within the rawhide outer layer such that the pizzle is externally viewable through the cut-out window. Further, the pizzle is rolled within the rawhide outer layer such that no edges of the pizzle protrude through the cut-out window.

Finally, as can be appreciated by one in the art, the present invention also comprises a method for forming and using the chew described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a chew for domestic carnivorous animals and, more specifically, to a rawhide chew with a pizzle inner member. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Description

Figure 1:
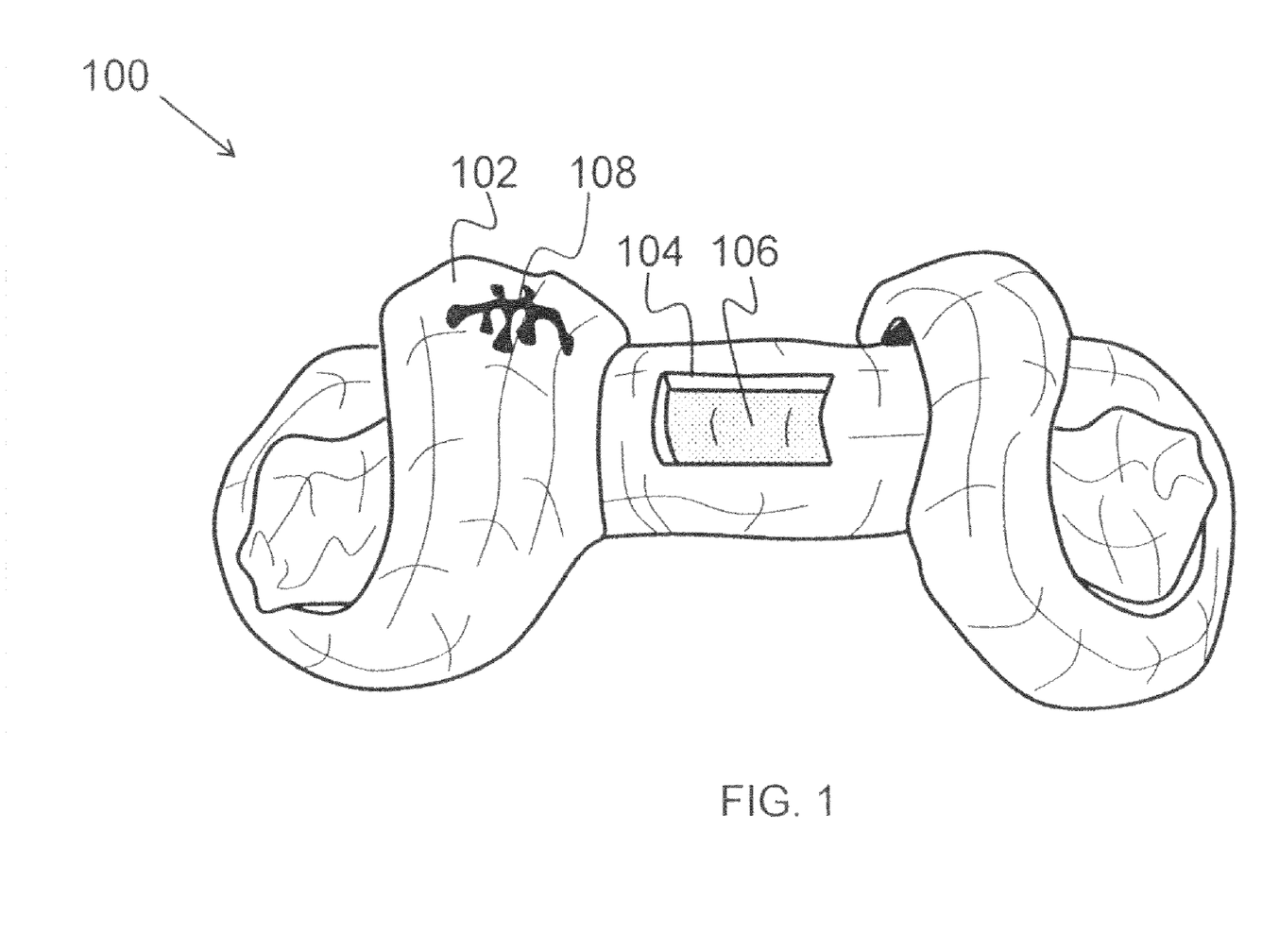
FIG. 1 is an illustration of a rawhide chew with a pizzle inner member according to the present invention.

As shown in FIG. 1, the present invention is a chew 100 for domestic carnivorous animals. While chews have long been known in the art, the present invention improves upon the prior art by combining two durable chew materials into a single chew 100 to vary the chew consistency of the chew 100. FIG. 1 provides an illustration of a chew 100 according to the present invention. As shown, the chew 100 includes a rawhide outer layer 102 with a cut-out window 104 formed therethrough. The cut-out window 104 provides a display area to externally view the inner member 106, which is pizzle. Finally, a flavor layer 108 coats the chew 100 to provide an odor and taste that is appetizing to a domestic carnivorous animal, such as a dog.

Figure 2:
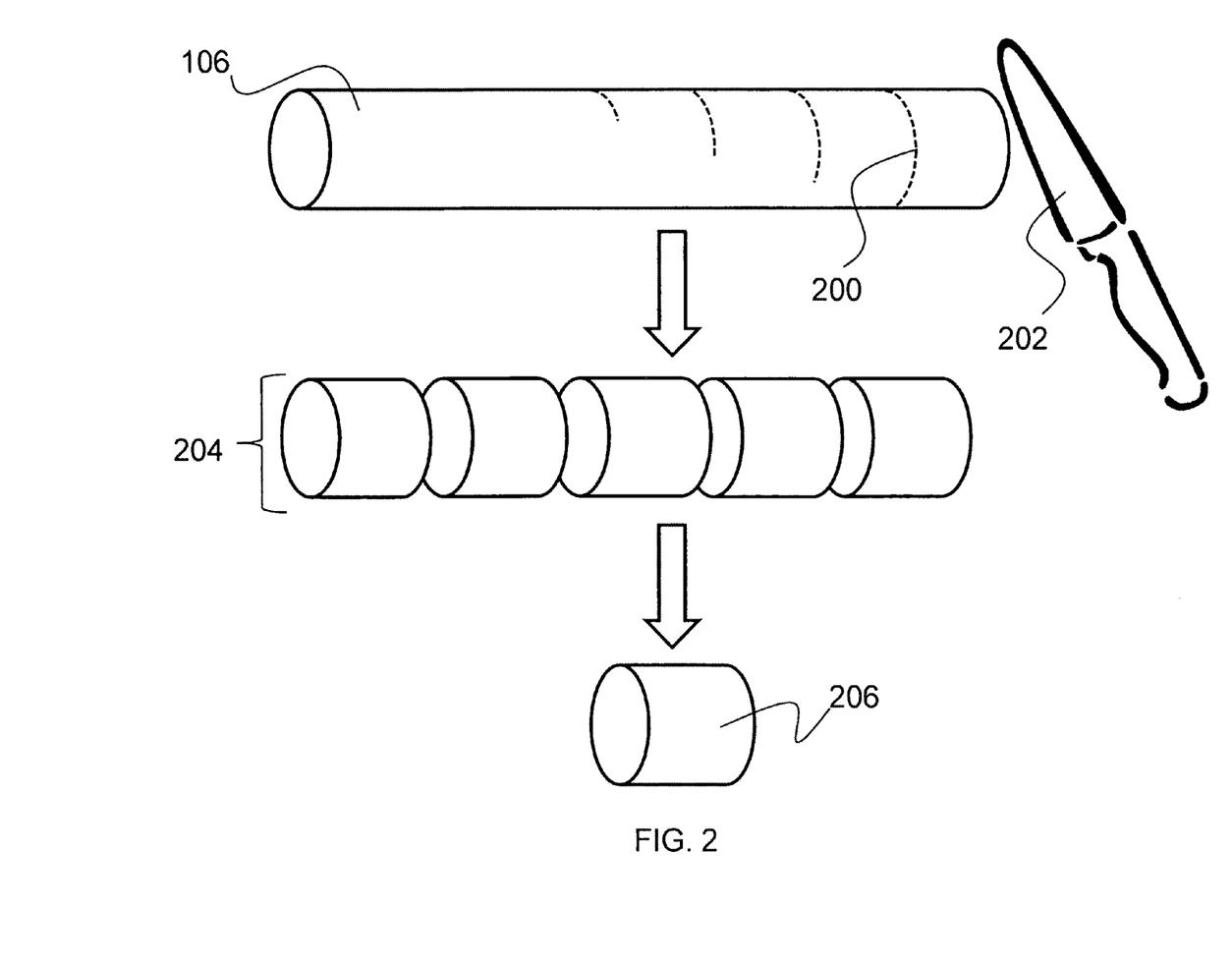
FIG. 2 is an illustration of an elongated pizzle member being cut into a plurality of pizzle sections.

For further understanding, FIGS. 2 through 8 illustrate a method for making the chew 100 described herein. As shown in FIG. 2, the inner member 106 is formed of pizzle. Pizzle is a term that is used to refer to a penis of a non-human animal. For example, the term pizzle is commonly associated with a bull penis. Pizzles are often used as chewing treats for dogs as they are very hard and durable. When a dog starts to chew on a dried pizzle the pizzle becomes very chewy from the dog's saliva, creating a unique and interesting texture for the dog while he is chewing.

As depicted in FIG. 2, the inner member 106 is originally provided as an elongated member of pizzle. The inner member 106 is then cut 200 using a cutting device 202. In this process, the cutting device 202 is any suitable mechanism or device that is capable of cutting 200 the inner member 106 into a plurality of pizzle sections 204, non-limiting examples of which includes a knife, slicer, chopper, etc. As can be understood by one skilled in the art, although the pizzle section 204 is depicted as a cross-sectional cut of the inner member 106, each pizzle section 204 can be cut into any suitable cut or piece.

Figure 3:
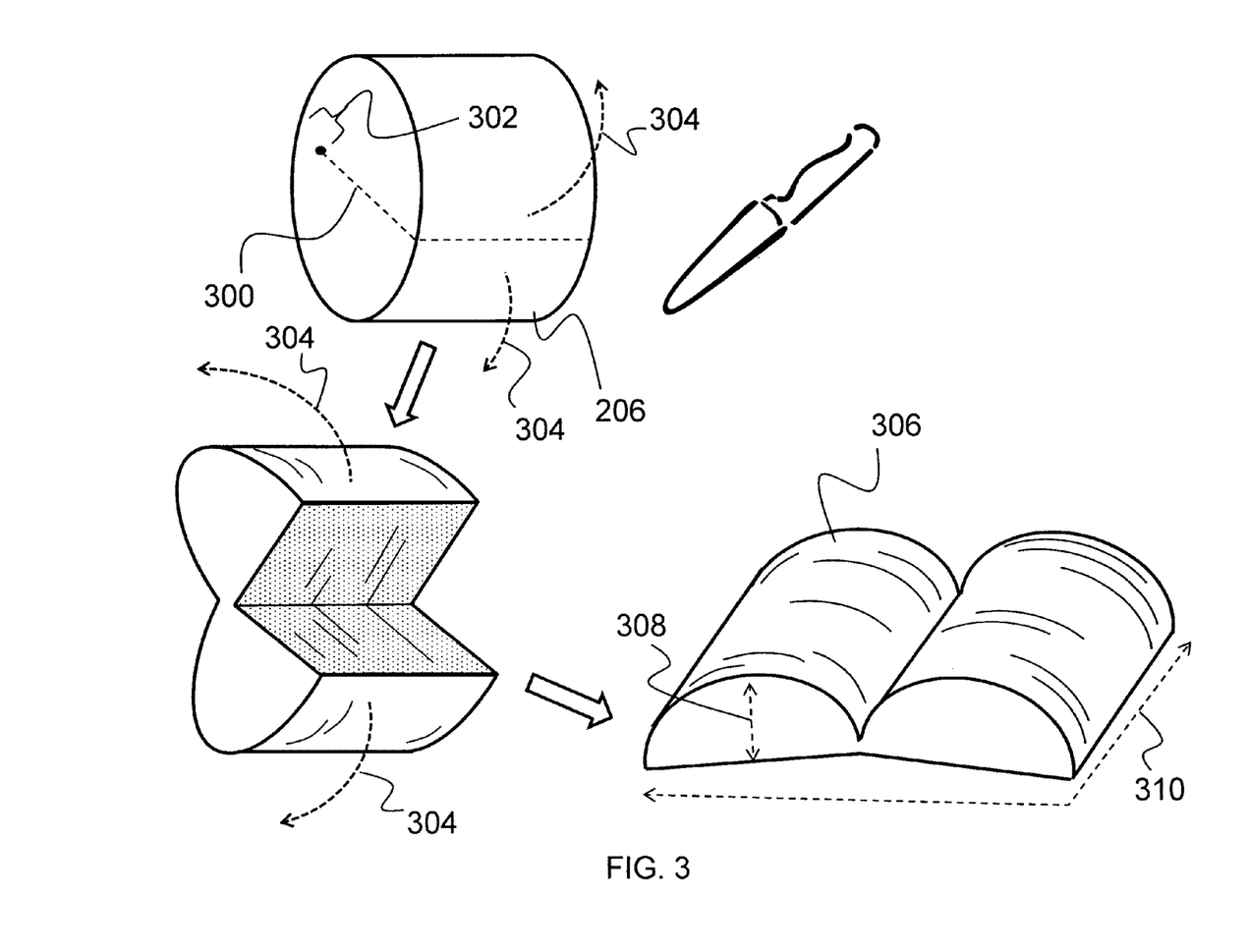
FIG. 3 is an illustration of a pizzle section being butterflyed.

After being cut into a plurality of pizzle sections 204, a single pizzle section 206 is taken for further processing. As shown in FIG. 3, each single pizzle section 206 is butterflyed, in which the piece 206 is laid out flat on a cutting board and cut 300 in half parallel to the board from one side almost all the way to the other. A small "hinge" 302 is left at the one side, which is used to fold 304 the pizzle piece out like a book. The resemblance of this unfolding motion to the wings of a butterfly is what gives this cut its name. The final result is an expanded piece of pizzle 306 with half the thickness 308 and twice the surface area 310 of the original pizzle section 206. The pizzle section 206 is butterfly cut to fully cover the interior of the window. Pizzles are relatively thin and expensive. The butterfly cut allows for the most interior coverage of the window (i.e., completely covering the hole, depicted as element 402 in FIG. 4) with the least amount of pizzle being used, thus maximizing the component.

Figure 4:
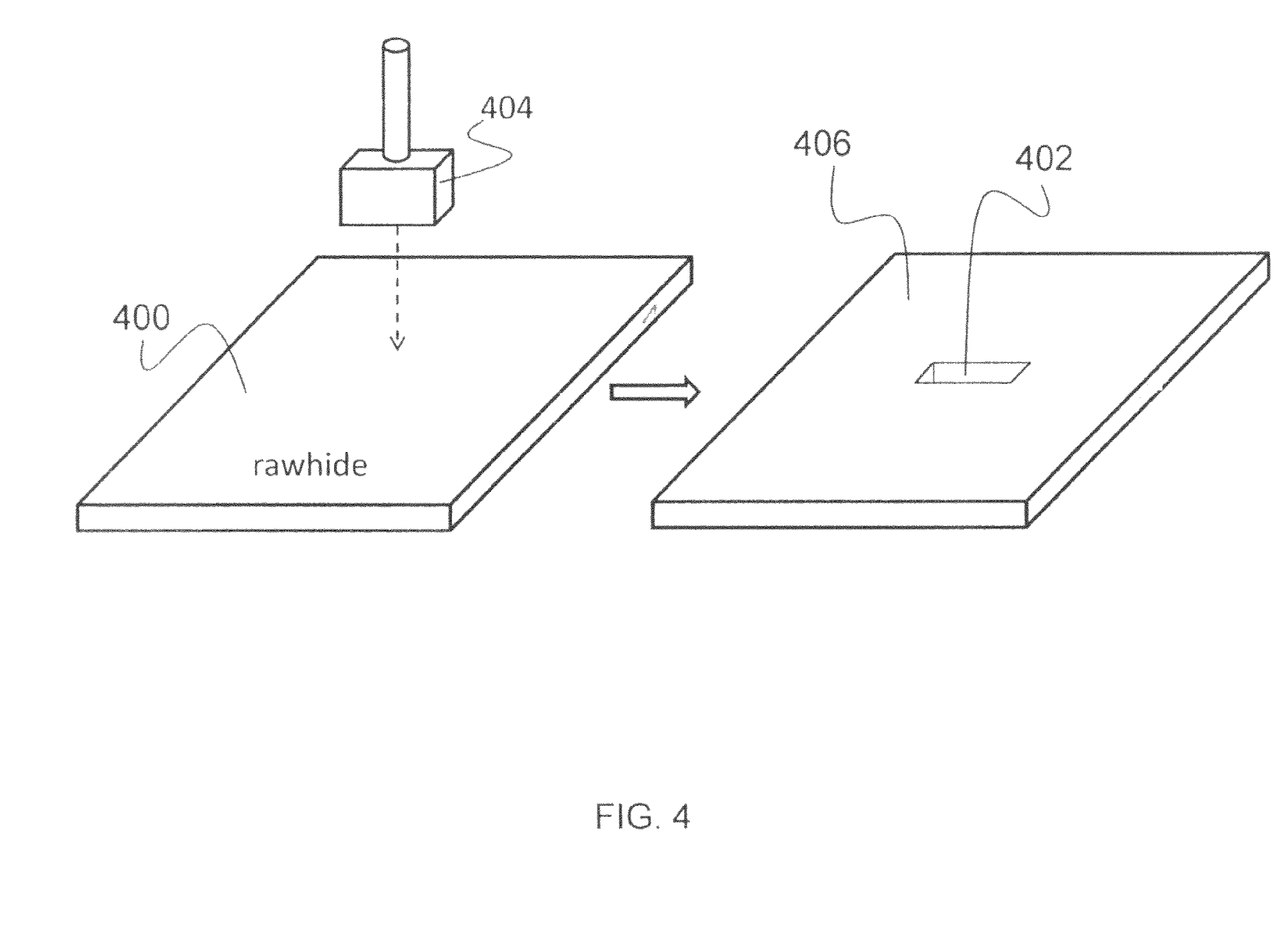
FIG. 4 is an illustration of a rawhide sheet being cut to form hole therethrough.

As noted above with respect to FIG. 1, the pizzle (i.e., inner member 106) is rolled within a rawhide outer layer 102. As shown in FIG. 4, the rawhide outer layer is initially in the form of a sheet of rawhide 400. Rawhide is a hide or animal skin that has not been exposed to a tanning process. Rawhide is typically more durable than leather and will soften when becoming wet. Due to its durability and pliability, rawhide is well received by dogs as a chew to encourage and satiate their natural tendency to chew.

As described above, the present invention includes a cut-out window that allows a consumer to view the interior of the chew. To generate the cut-out window, a hole 402 is cut through the sheet of rawhide 400. The hole 402 is cut using any suitable mechanism or device. As a non-limiting example, a die-cutting machine 404 is used to die-cut the hole 402 through the sheet of rawhide 400, resulting in a cut-out rawhide sheet 406.

Figure 5:
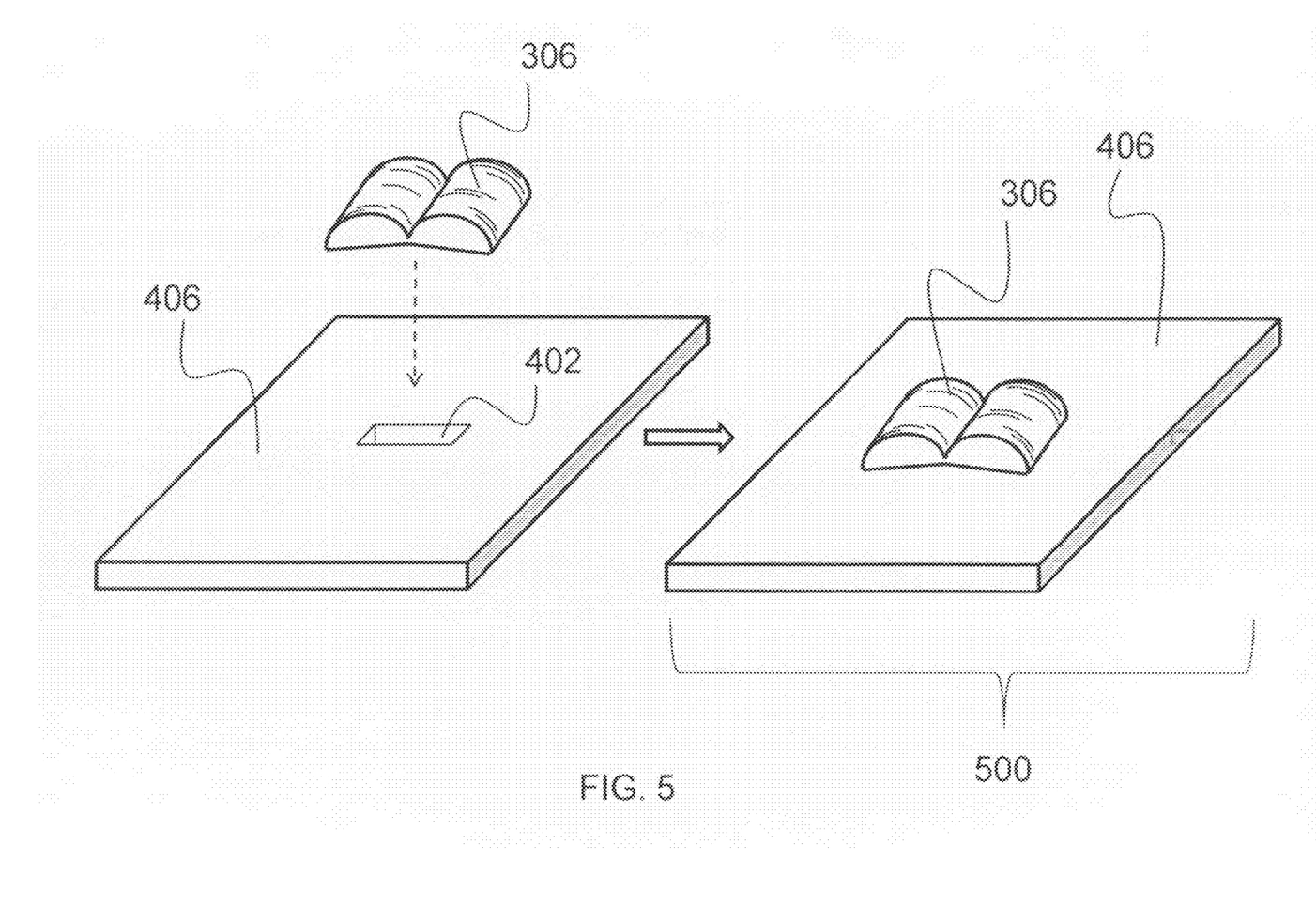
FIG. 5 is an illustration of the pizzle section being superimposed onto the rawhide sheet over the hole to form a stacked member.

As shown in FIG. 5, the cut-out rawhide sheet 406 is then laid out, with the expanded piece of pizzle 306 positioned over the hole 402 in a superimposed relationship, resulting in a stacked member 500. Thus, the stacked member 500 is formed of at least a rawhide sheet 406 and pizzle 306 positioned over the hole 402.

Figure 6:
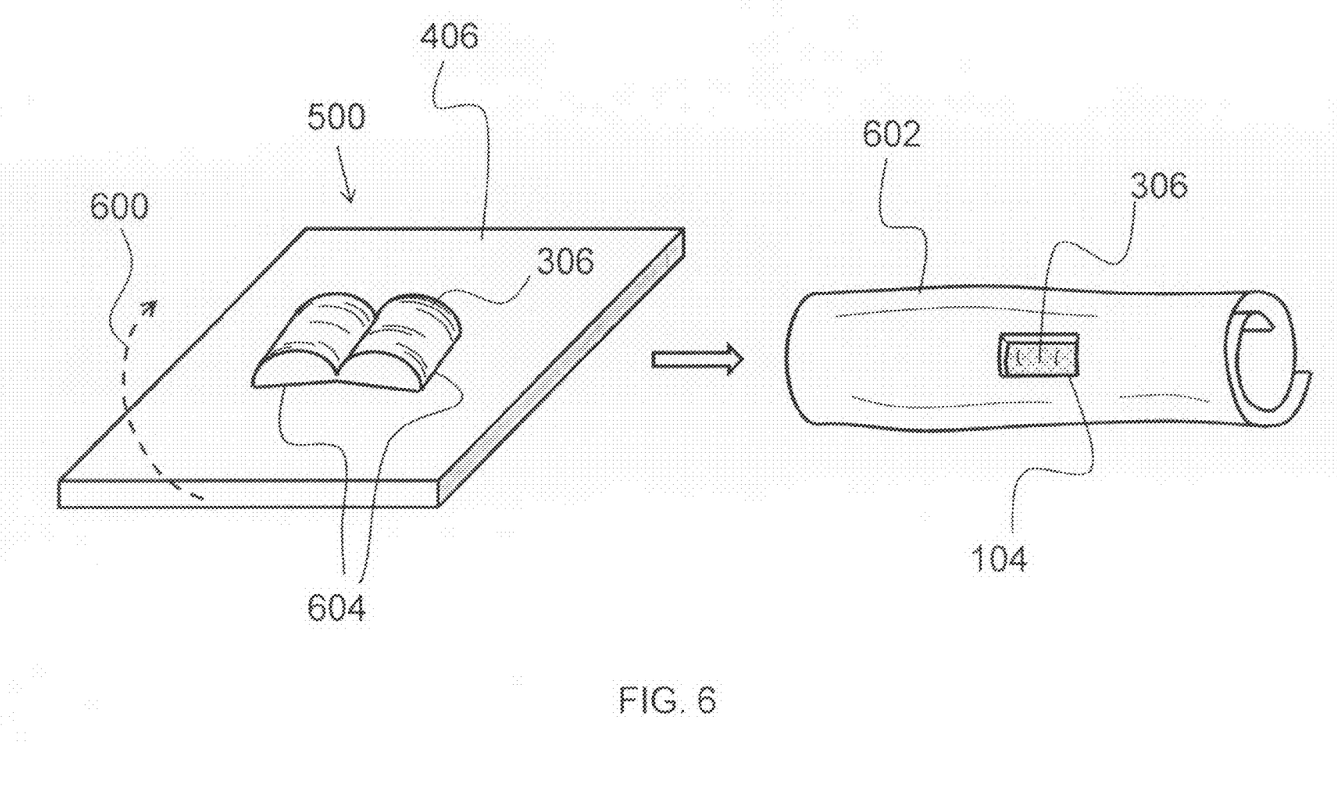
FIG. 6 is an illustration of the stacked member being rolled to form a rolled member.

As shown in FIG. 6, the stacked member 500 is rolled 600 up such that the pizzle 306 is rolled inside of the rawhide sheet 406 to form a rolled member 602, with a rawhide outer layer. Once rolled, the hole becomes a cut-out window 104 that provides a display area to view the pizzle 306 (referred to as the inner member 106 in FIG. 1) rolled therein. Importantly, the pizzle 306 includes edges 604. Once rolled, the edges 604 of the pizzle 306 are rolled inside of the rawhide sheet 406 such that no edges 604 protrude (or are otherwise accessible or viewable) through the cut-out window 104. In other words, the edges are masked and framed by the cut-out window 104.

Figure 7:
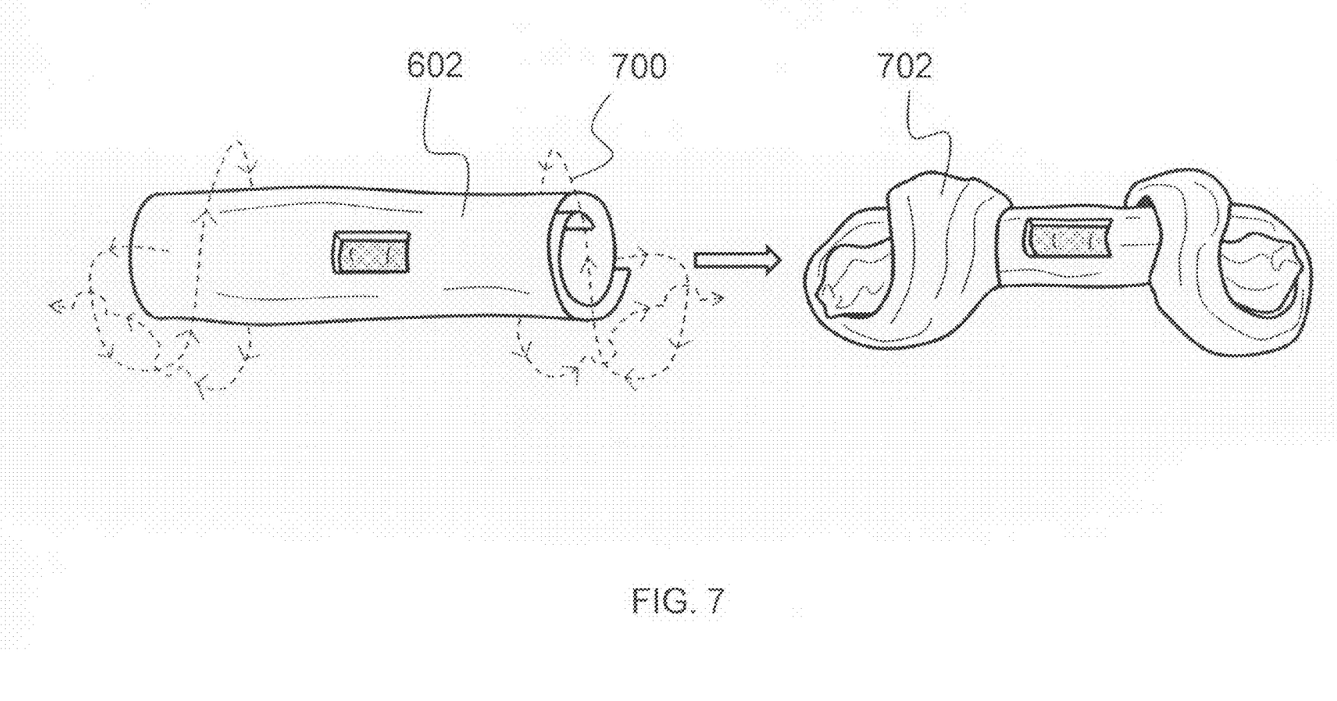
FIG. 7 is an illustration of the rolled member being knotted.

As shown in FIG. 7, once rolled or otherwise elongated, the rolled member 602 can be knotted 700 to form a knotted member 702. The knotting can be done on a single end or multiple ends of the rolled member 602. Further and as can be appreciated by one skilled in the art, any number or shape of knots can be added to the rolled member 602 to form the knotted member 702. In a desired aspect and as illustrated, each end of the rolled member 602 is knotted 700 to form the knotted member 702.

Figure 8:
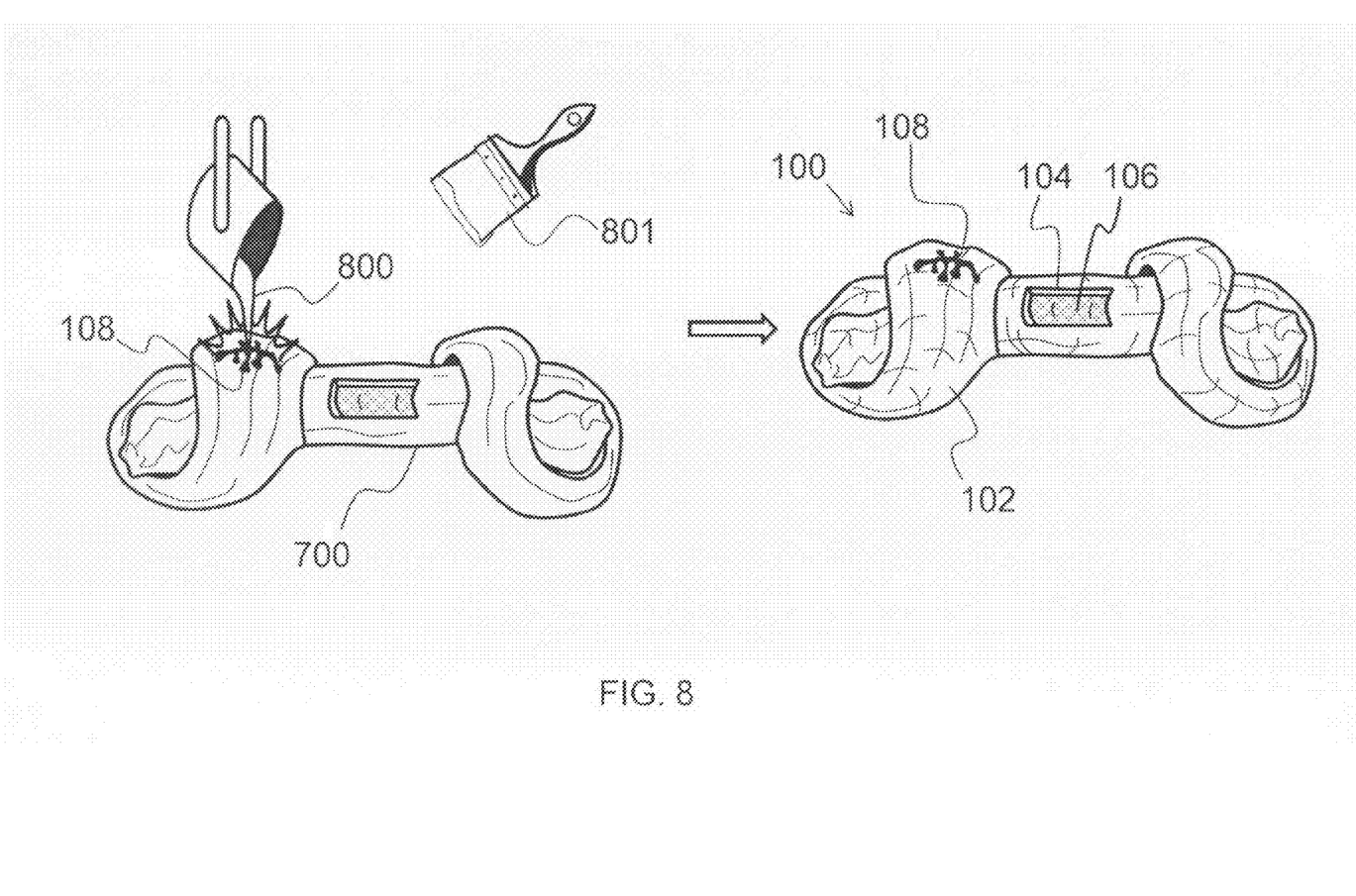
FIG. 8 is an illustration of a flavor basting being applied to the rolled member to form a chew according to the present invention.

While the combination of rawhide and pizzle provides a durable chew with two distinct chewing qualities, as can be appreciated by one skilled in the art, neither of the components provide an odor or taste that is extremely enticing to a dog. Thus, a flavor and odor can be added to the chew to entice a dog to begin chewing on the chew. For example and as depicted in FIG. 8, a flavor basting 800 can be added to the knotted member 702 to create a chew 100 with a flavor layer 108 that coats the chew 100. The flavor basting 800 is suitable solution or material with an odor and taste that is enticing to a dog. As a non-limiting example, the flavor basting 800 is a solution made of water, beef liver powder, smoke flavoring, and coloring agents, such as Food Drug and Cosmetic Act (FC&C) Yellow No. 5, FD&C Red No. 40, FD&C Blue No. 1, and FD&C Yellow No. 6.

The flavor basting 800 can be added using any suitable technique, such as being brushed 801 on, sprayed on, or dipped. Further, as can be appreciated by one skilled in the art, the flavor basting 800 can be added at any time in the process of forming the chew 100. Although the flavor basting 800 is depicted as being added to the knotted member 702, it can be added during any point in the process, such as being added to each of the pizzle and rawhide sheet individually, or to the rolled member, etc.

As described above and as shown in FIG. 8, the chew 100 includes the rawhide outer layer 102 with a cut-out window 104 formed therethrough. The cut-out window 104 provides a display area to view the inner member 106, which is pizzle. Finally, the flavor layer 108 coats the chew 100 to provide an odor and taste that is appetizing to a dog to entice the dog to begin chewing on the chew 100.

It is important to note that the cut-out window 104 is a unique improvement over the prior art by providing a safe window to an interior of the chew 100. For example, the inner member 106 (i.e., pizzle) is displayed so that the characteristics of the chew 100 can be properly exhibited while the chew 100 sits on a store shelf. Thus, by displaying the inner member 106 through the cut-out window 104, a purchaser is provided a window into the interior of the chew 100. It is known in the industry that pizzle enhances rawhide chew and chewing longevity. Thus, by providing a window into the interior of the chew 100, a retailer is able to display these characteristics to a potential consumer and, therefore, hopefully increase sales. Further, the pizzle market is fairly large in the U.S., but the rawhide market is considerably larger. Thus, by combining rawhide and pizzle, the present invention is a cross-over product that is intended to introduce pizzles to the much larger U.S. rawhide market.

Further, an advantage of the cut-out window 104 is that it masks all the edges of the inner member 106. In other words, while the inner member 106 can be seen through the cut-out window 104, each of the edges of the inner member 104 are tucked beneath the outer layer 102 such that no edges protrude through the cut-out window 104. By concealing all the edges of the inner member 106, the dog cannot easily grasp the inner member 106 and pull the inner member 106 from the chew 100, thereby enhancing the longevity of the chew 100.

What is claimed is:

1. A method for forming a rawhide chew, comprising a step of forming a rawhide chew such that the rawhide chew includes outer layer formed of a rawhide sheet, the rawhide outer layer having a hole cut therethrough to form a cut-out window, and pizzle positioned within the rawhide outer layer such that the pizzle is externally viewable through the cut-out window; and wherein the step of forming the rawhide chew further comprises steps of:

cutting an elongated member of pizzle to form a plurality of pizzle sections;

selecting a pizzle section from the plurality of pizzle sections;

cutting the pizzle section to form an expanded piece of pizzle cutting a hole through a rawhide sheet, resulting in a cut-out rawhide sheet positioning the expanded piece of pizzle over the hole in a superimposed relationship, resulting in a stacked member; and rolling the stacked member such that the expanded piece of pizzle is rolled inside of the rawhide sheet to form a rolled member with a rawhide outer layer, whereby once rolled, the hole becomes a cut-out window that provides a display area to view the pizzle rolled therein.

2. The method according to claim 1, wherein the step of forming the rawhide chew further comprises steps of:

knotting the rolled member to formed a knotted member; and coating the rawhide outer layer with flavor basting.

\* \* \* \* \*